US008774766B2

(12) United States Patent
Ding

(10) Patent No.: US 8,774,766 B2
(45) Date of Patent: Jul. 8, 2014

(54) AUTHENTICATION OF MOBILE COMMUNICATION DEVICE COMMUNICATING THROUGH WI-FI CONNECTION

(71) Applicant: Cellco Partnership, Basking Ridge, NJ (US)

(72) Inventor: Jihui Ding, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 13/871,050

(22) Filed: Apr. 26, 2013

(65) Prior Publication Data

US 2013/0244616 A1    Sep. 19, 2013

Related U.S. Application Data

(63) Continuation of application No. 12/947,549, filed on Nov. 16, 2010, now Pat. No. 8,489,072.

(51) Int. Cl.
*H04M 3/16* (2006.01)

(52) U.S. Cl.
USPC ........... 455/411; 370/329; 370/338; 370/331; 455/410

(58) Field of Classification Search
USPC ................. 455/411, 410; 370/329, 338, 331
See application file for complete search history.

(56) References Cited

U.S. PATENT DOCUMENTS

| 7,766,223 | B1 | 8/2010 | Mello et al. |
| 2007/0070935 | A1 | 3/2007 | Prakash et al. |
| 2008/0101291 | A1 | 5/2008 | Jiang et al. |
| 2008/0134306 | A1 | 6/2008 | Krishnan |
| 2011/0103318 | A1 | 5/2011 | Ekici et al. |

OTHER PUBLICATIONS

Entire prosecution history of U.S. Appl. No. 12/947,549, filed Nov. 16, 2010, entitled "Authentication of Mobile Communication Device Communicating Through Wi-Fi Connection."

*Primary Examiner* — David Q Nguyen

(57) ABSTRACT

A wireless mobile communication device may be configured to include its Mobile Device Number (MDN) and its Mobile Equipment Identification (MEID) with each outgoing communication request when communicating over the internet through a Wi-Fi connection. A server may be configured to authenticate each request by comparing the MEID and MDN which are received from the wireless mobile communication device with MEID and MDN pairs which are stored in an equipment registration database. The wireless mobile communication device may also be configured to communicate at different times through a different type of internet connection, such as through a cellular telecommunication system. During this mode of communication, the IP address and the MDN of the mobile communication device may instead be used for authentication purposes by the server.

19 Claims, 4 Drawing Sheets

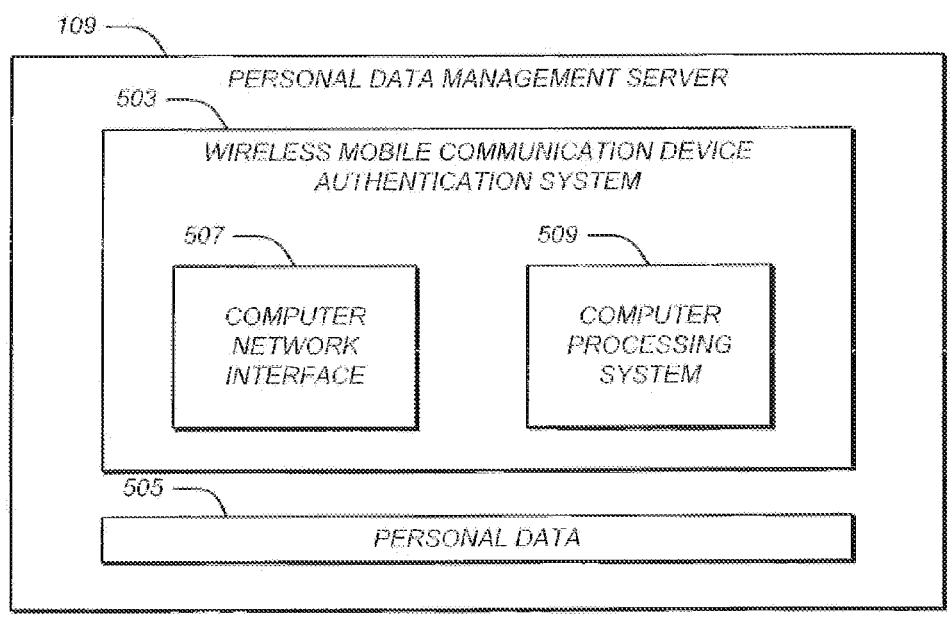

US 8,774,766 B2

AUTHENTICATION OF MOBILE COMMUNICATION DEVICE COMMUNICATING THROUGH WI-FI CONNECTION

RELATED APPLICATION

This application is a continuation and claims the benefit of U.S. application Ser. No. 12/947,549 Filed Nov. 16, 2010 entitled "AUTHENTICATION OF MOBILE COMMUNICATION DEVICE COMMUNICATING THROUGH WI-FI CONNECTION," the disclosure of which is entirely incorporated herein by reference.

BACKGROUND

Wireless mobile communication devices, such as smart phones, may communicate over the internet through different types of wireless connections, such as through a Wi-Fi connection and/or through a cellular telecommunication system, such as a 3G and/or 4G system.

When a cellular telecommunication system is used, the wireless mobile communication device may be assigned an IP address by the cellular telecommunication system when a data session is established. This IP address and the mobile device number (MDN) of the wireless mobile communication device may then be stored in an authentication, authorization, and accounting (AAA) server. The wireless mobile communication device may include its MDN and IP address in each communication request. These requests may be authenticated by verifying that the MDN and IP address in the communication request match a corresponding MDN and IP address pair in the AAA server.

The wireless mobile communication device may at different times communicate over the internet through a Wi-Fi connection. When in this mode of operation, the IP address of the wireless mobile communication device may be assigned by the internet service provider which provides the internet service used by the Wi-Fi connection, not the wireless cellular communication network. The IP address in the communication request from the wireless mobile communication device, therefore, may not be able to be matched to any MDN and IP address pair in the AAA server, even when the requests are authentic.

BRIEF DESCRIPTION OF THE DRAWINGS

The drawings illustrate illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

FIGS. 4A and 4B illustrate examples of different types of communication requests which may be generated by the wireless mobile communication device illustrated in FIG. 2.

FIG. 5 illustrates an example of the personal data management server illustrated in FIG. 2.

DETAILED DESCRIPTION

Illustrative embodiments are now described. Other embodiments may be used in addition or instead. Details which may be apparent or unnecessary may be omitted to save space or for a more effective presentation. Some embodiments may be practiced with additional components or steps and/or without all of the components or steps which are described.

Figure 1:
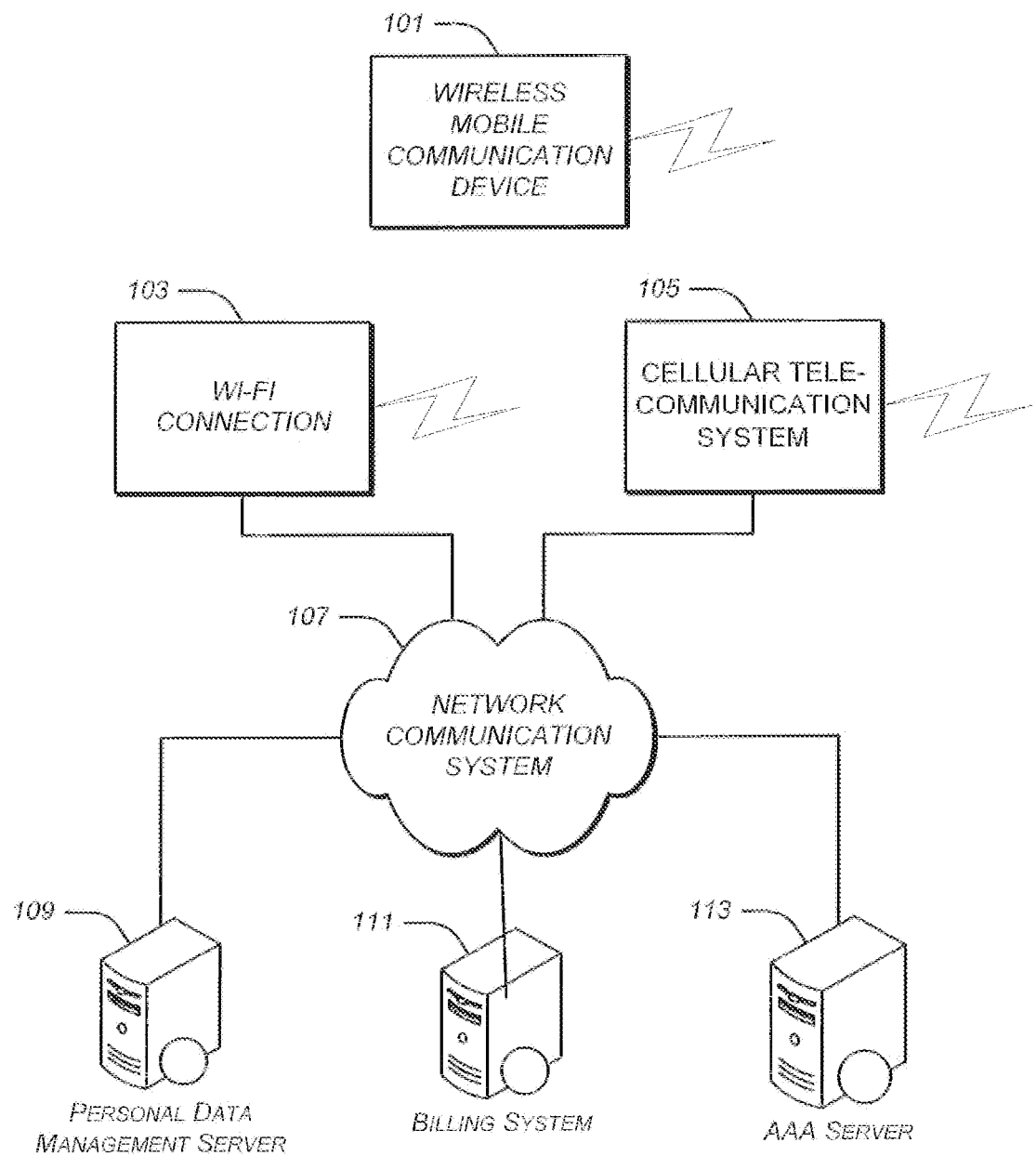
FIG. 1 illustrates an example of a communication network.

FIG. 1 illustrates an example of a communication network. As illustrated in FIG. 1, the communication network may include a wireless mobile communication device 101, a Wi-Fi connection 103, a cellular telecommunication system 105, a network communication system 107, a personal data management server 109, a billing system 111, and an authentication, authorization, and accounting (AAA) server 113. Each of these components is merely illustrative. The communication network may include multiple instances of one or more of these components, additional components, and/or not all of these components.

The cellular telecommunication system 105 may be of any type, such as a wireless 3G or 4G system.

The network communication system 107 may be configured to deliver communications which it receives from the Wi-Fi connection 103 and/or the cellular telecommunication system 105 to the personal data management server 109, the billing system 111, and/or the AAA server 113, and/or vice-versa.

The network communication system 107 may be of any type, for example, the network communication system 107 may consist of or include a cellular telephone network, the internet, a local area network, and/or a wide area network.

The personal data management server 109 may be configured to store and manage personal data about users, such as subscribers to the cellular telecommunication system 105. The personal information may include account information, financial information, personal identity information, and/or any other type of personal information.

The billing system 111 may be configured to receive, store, and provide accounting information relating to subscriptions to network services, such as subscriptions to the cellular telecommunication system 305.

The AAA server may be configured to receive, store, and deliver information relating to authentication, authorization, and accounting in connection with subscribers and users of the cellular telecommunication system 105.

Figure 2:
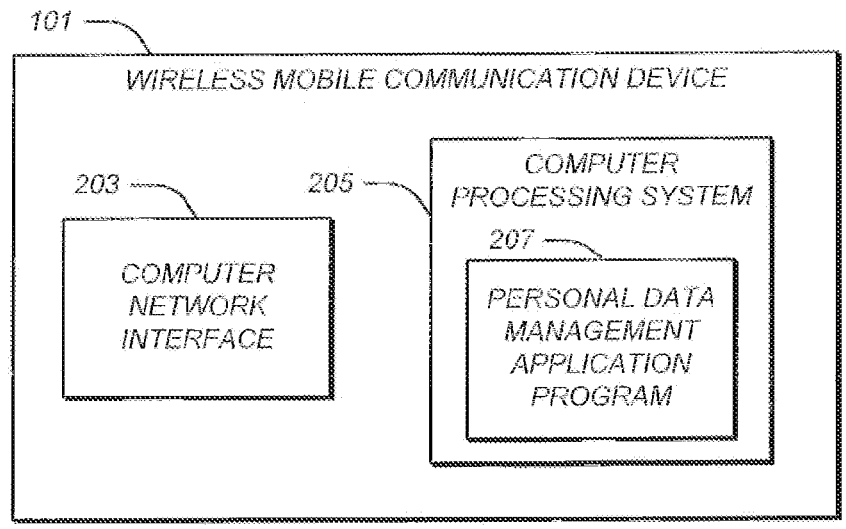
FIG. 2 illustrates an example of the wireless mobile communication device illustrated in FIG. 1.

FIG. 2 illustrates an example of the wireless mobile communication device 101 illustrated in FIG. 1. The wireless mobile communication device illustrated in FIG. 1 may be different than what is illustrated in FIG. 2, and the wireless mobile communication device illustrated in FIG. 2 may be used in communication networks different from what is illustrated in FIG. 1.

The wireless mobile communication device 101 may be of any type. For example, the wireless mobile communication device 101 may be a smart phone, a laptop computer, a PDA, and/or part of a larger system.

The wireless mobile communication device 101 may include a computer network interface 203 and a computer processing system 205 which may include a personal data management application program 207.

The personal data management application program 207 may be configured to store, update, and retrieve personal data about the user of the wireless mobile communication device 101. This data may be stored in a remote server, such, as the personal data management server 109. The personal data management application program 207 may be configured to communicate with this remote server.

The computer network interlace 203 may be configured to send communications wirelessly over the internet through a Wi-Fi connection, such as through the Wi-Fi connection 103, and, at different times, through a different type of wireless internet network connection, such as through the cellular telecommunication system 105.

The type of wireless internet network connection which is used by the wireless mobile communication device 101 may depend upon what is available and/or what is selected by a user of the device.

The computer processing system 205 may be configured to determine whether communications are being sent by the computer network interface 203 through the Wi-Fi connection or through the different type of wireless internet network connection. This may be done by checking the status of an internal connection type indicator or by any other means. This checking may be performed by the personal data management application program 207.

If the determination indicates that the communications are being sent by the computer network interface 203 through the Wi-Fi connection 103, the personal data management application program 207 may be configured to cause communication authentication information of a first type to be included in each communication. On the other hand, if the determination indicates that the communications are being sent by the computer network interface 203 through the different type of wireless internet network connection, such as through the cellular telecommunication system 105, the personal data management application program 207 may cause communication authentication information of a second type which is different from the first type to be included in each communication.

The first type of authentication information may be of any type. For example, the first type of authentication information may include the mobile equipment identifier (MEID) for the wireless mobile communication device. The MEID may be a globally unique number identifying each physical piece of mobile equipment. When such a device is activated with an account, the MEID of this device and its mobile directory number (MDN) may be stored in a billing system, such as the billing system 111 illustrated in FIG. 1.

The billing system 111 may be configured to provide an API which an outside application may use to look up an MDN which is related to an MEID specified in a look up query by the outside application and/or vice versa.

The personal data management application program 207 may cause the MDN to be included within communication requests sent by the computer network interface 203.

The second type of authentication information may be of any type. For example, the second type of authentication information may include the IP address for the wireless mobile communication device 101. As indicated in the Description of Related Art section above, this IP address may be dynamically assigned to the wireless mobile communication device 101 by the cellular telecommunication system through which the wireless mobile communication device 101 may be communicating over the internet.

The personal data management application program 207 may be configured to cause the communication authentication information of the first and the second type to both include a flag indicative of whether the communication is being sent through the Wi-Fi connection or through the other type of wireless internet network connection.

Figure 3:
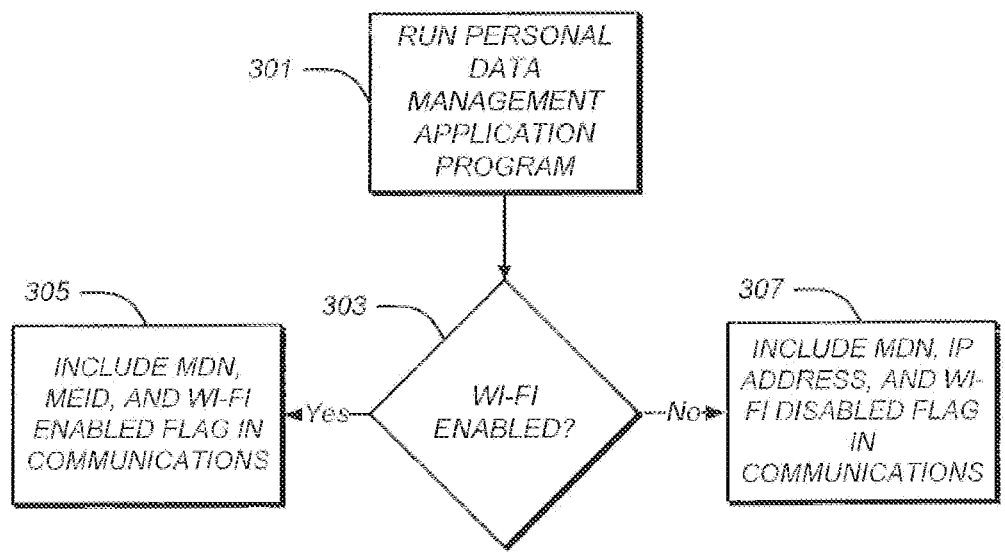
FIG. 3 illustrates an example of a process of including authentication information within a communication from the wireless mobile communication device illustrated in FIG. 2.

FIG. 3 illustrates an example of a process of including authentication information within a communication from the wireless mobile communication device 101 illustrated in FIG. 2. The process illustrated in FIG. 3 may be implemented by a wireless mobile communication device different from the one illustrated in FIG. 2. Similarly, the wireless mobile communication device illustrated in FIG. 2 may be configured to implement a different process.

A user of the wireless mobile communication device 101 may cause the personal data management application program 207 to be executed, as illustrated by a Run Personal Data Management Application Program step 301 in FIG. 3. The personal data management application program 207 may then seek to determine whether the Wi-Fi connection is enabled, as reflected by a Wi-Fi Enabled? decision step 303. As indicated above, this determination may be made by checking an internal Wi-Fi enabled status indicator or by any other means.

If the determination indicates that Wi-Fi is enabled, the personal data management application program 207 may cause the MDN and MEID of the wireless mobile communication device to be included in each communication request, along with a Wi-Fi enabled flag, as reflected by an Include MDN, MEID, and Wi-Fi Enabled Flag In Communications step 305.

On the other hand, if the determination indicates that Wi-Fi is not enabled, the personal data management application program 207 may cause the MDN and IP address of the wireless mobile communication device 101 to be included in each communication request, along with a Wi-Fi disabled flag, as reflected by an Include MDN, IP address, and Wi-Fi Disabled Flag In Communications step 307.

FIGS. 4A and 4B illustrate examples of different types of communication requests which may be generated by the wireless mobile communication device 101 illustrated in FIG. 2. The wireless mobile communication device illustrated in FIG. 2 may be configured to generate requests which are different than what is illustrated in FIGS. 4A and 4B. The requests which are illustrated in FIGS. 4A and 4B may also be generated by a wireless mobile communication device different than what is illustrated in FIG. 2.

FIG. 4A illustrates an example of a header which the personal data management application program 207 may cause to be included with an HTTPS communication request issued by the computer network interface 203, when the wireless mobile communication device 101 is communicating over the internet through the Wi-Fi connection 103. As illustrated in FIG. 4A, the header may include the mobile directory number (MDN) and the mobile equipment identifier (MEID) of the wireless mobile communication device 101, along with the Wi-Fi flag set to "Enabled."

FIG. 4B illustrates an example of a header which the personal data management application program 207 may cause to be included with an HTTPS communication request issued by the computer network interface 203, when the wireless mobile communication device 101 is communicating over the internet through a different type of wireless internet network connection, such as through the cellular telecommunication system 105. As illustrated in FIG. 4B, the HTTPS request may include the mobile directory number (MDN) and the IP address of the wireless mobile communication device 101, along with the Wi-Fi flag set to "Disabled."

The authentication information which is included with the communication request may be different than what is illustrated in FIGS. 4A and 4B. For example, the authentication information which is included when the wireless mobile communication device is communicating through the Wi-Fi connection may include the IP address of the wireless mobile communication device 101. Similarly, the authentication information which is included when the wireless mobile communication device is communicating through the different type of wireless internet network connection, such as through the cellular telecommunication system 105, may include the MEID of the wireless mobile communication device. In either or both cases, the Wi-Fi status flag may also be omitted. The authentication information may be different in other ways.

FIG. 5 illustrates an example of the personal data management server 109 illustrated in FIG. 1. The personal data management server illustrated in FIG. 1 may be different than the personal data management server illustrated in FIG. 5, and the personal data management server illustrated in FIG. 5 may be used in communication networks different than what is illustrated in FIG. 1

The personal data management server 109 may include a wireless mobile communication device authentication system 503 and personal data 505. The wireless mobile communication device authentication system 503 may include a computer network interface 507 and a computer processing system 509.

The personal data 505 may be contained within a database. The personal data may include data about subscribers to the network communication system 107, such as account information, financial information, information about their personal identity, and/or any other type of personal data.

The computer network interface 507 may be configured to receive communications over the network communication system 107 sent from the wireless mobile communication device 101 through the Wi-Fi connection 103 or through a different type of wireless internet network connection, such as the cellular telecommunication system 105 illustrated in FIG. 1.

The computer processing system 509 may be configured to determine whether each communication request which is received by the computer network interface 507 was sent through the Wi-Fi connection 103 or through the different type of wireless internet network connection. The computer processing system 509 may be configured to make this determination based on information in the received communication, such as a flag in the received communication, such as the "Wi-Fi" flag illustrated in FIG. 4A (shown set to "Enabled") and FIG. 4B (shown set to "Disabled"). The determination may in addition or instead be based on other information, such as the presence or absence of a mobile equipment identifier (MEID) in the communication request.

The computer processing system 509 may be configured to authenticate each communication request which is received by the computer network interlace 507. If the computer processing system 509 determines that the communication request was sent through the Wi-Fi connection 103, the authentication may use a first authentication method. On the other hand, if the determination indicates that the communication was sent through a different type of wireless internet network connection, such as the cellular telecommunication system 105, the authentication may use a second authentication method which is different from the first authentication method.

The first authentication method may be based at least in part on the mobile equipment identifier (MEID) for the wireless mobile communication device which sent the communication request through the Wi-Fi connection and which is received by the computer network interface 507 as part of the received communication request. The computer network interface 507 may be configured to receive the MDN and the MEID of the wireless mobile communication device which sent each communication as part of the information which is received.

The second authentication method may be based at least in part on the IP address for the wireless mobile communication device which sent the received communication through the different type of wireless internet network connection. The computer network interface 507 may be configured to receive the MDN and the IP address of the wireless mobile communication device which sent each communication request as part of the information which is received.

Figure 6:
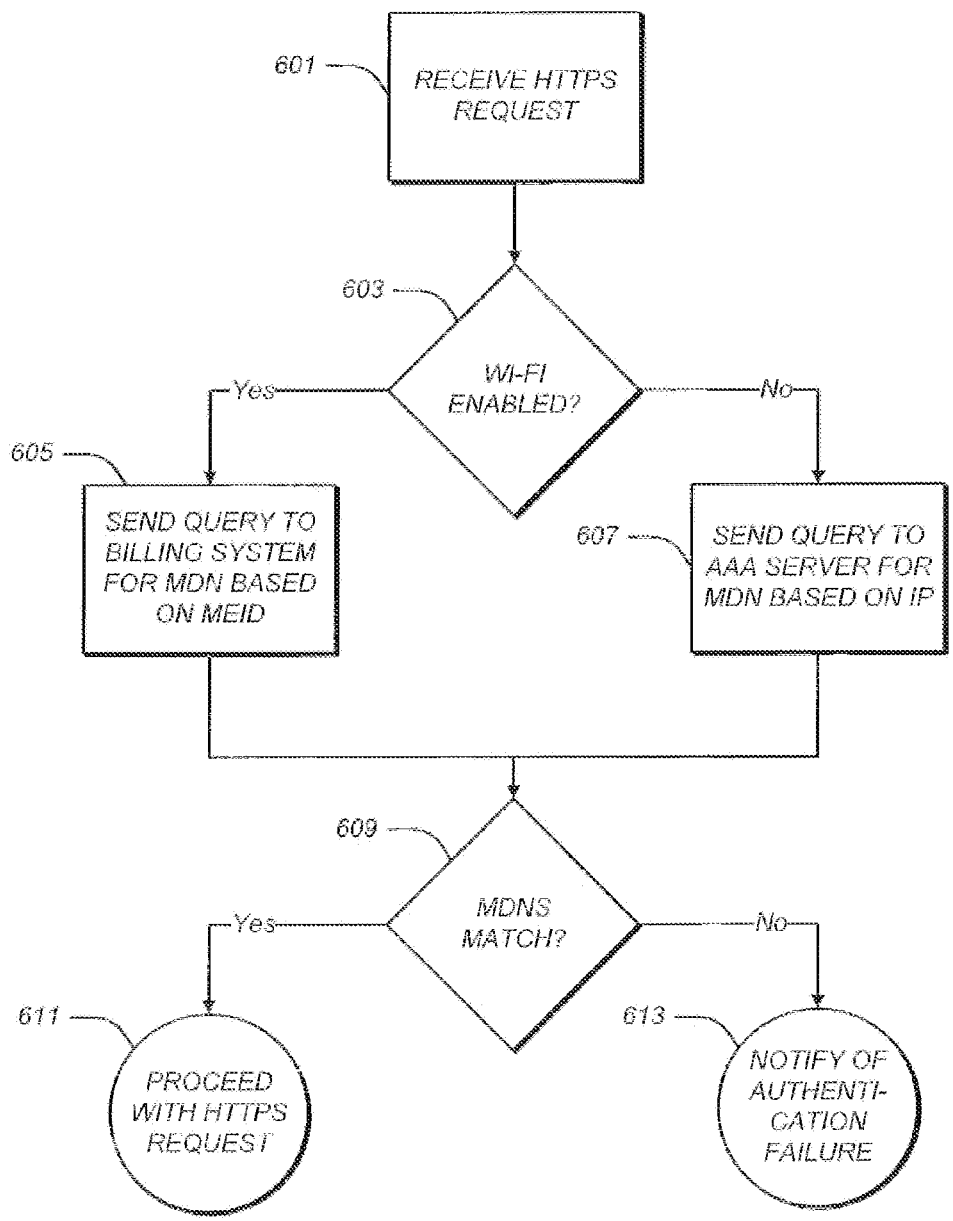
FIG. 6 illustrates an authentication process which may be performed by the wireless mobile communication device authentication system illustrated in FIG. 5.

FIG. 6 illustrates an authentication process which may be performed by the wireless mobile communication device authentication system illustrated in FIG. 5. The process may be performed by a wireless mobile communication device authentication system different from the one illustrated in FIG. 5, and the wireless mobile communication device authentication system illustrated in FIG. 5 may perform a different process.

An HTTPS communication request may be received by the computer network interface 507, as illustrated by a Receive HTTPS Request step 601 in FIG. 6. The computer processing system 509 may then determine whether the mobile communication device sent the request through a Wi-Fi connection, as illustrated by a Wi-Fi Enabled? decision step 603. As indicated above, this determination may be made by checking a Wi-Fi status flag within the communication request and/or by any other means.

If Wi-Fi is enabled, the computer processing system 509 may send a query to the billing system 111 which seeks the MDN of the wireless mobile communication device which corresponds to the received MEID which was received from the wireless mobile communication device, as illustrated by a Send Query To Billing System For MDN Based On MEID step 605. This query may make use of an API which the billing system 111 provides for this purpose.

If Wi-Fi is not enabled, on the other hand, the computer processing system 509 may cause a query to be sent to the AAA server 113 which seeks the MDN of the wireless mobile communication device which corresponds to the IP address which was received from the wireless mobile communication device, as illustrated by a Send Query to AAA Server For MDN Based On IP step 607.

Although having been described as sending these queries to the billing system 111 or to the AAA server 113, the queries may in addition or instead be sent to a different type of computer system.

In either case, the MDN of the authentic wireless mobile communication device may be returned. The returned MDN may be compared to the MDN which was provided within the communication request from the wireless mobile communication device, as received by the computer network interlace 507, as illustrated by an MDNs Match? decision step 609.

If they do match, this may indicate that the wireless mobile communication device which sent the communication request is authentic. This may justify proceeding with satisfying the HTTPS request, as illustrated by a Proceed With HTTPS Request step 611. In response to the request, for example, the personal data management server 109 may provide, update, and/or delete personal information that is stored within the personal data management server 109.

If the MDNs do not match, on the other hand, this may indicate that the communication request was not sent by the authentic wireless mobile communication device. This may result in a notice being issued of authentication failure, as illustrated by a Notify of Authentication Failure step 613.

Unless otherwise indicated, the personal data management server 109, the billing system 111, and the AAA server 113 which have been discussed herein may each be implemented with a computer system configured to perform the functions which have been described herein for the component. Each computer system may include one or more computers at the same or different locations. When at multiple locations, the computers may be configured to communicate with one another through a wired and/or wireless network communication system. Each computer may include one or more processors, memory devices (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, mice, displays, microphones, sound reproduction systems, and/or touch screens). Each computer may be a personal computer, mainframe, workstation, single user system, multi-user system, server, portable computer, hand-held device, cell phone, smart cell phone, tablet, or part of a larger system, such a vehicle, appliance, and/or telephone system. Each computer may include software (e.g., one or more operating systems, device drivers, application programs (such as the personal data management application program 207), and/or communication programs), which may be configured when executed to cause the computer to perform one or more of the functions which have been described herein for the computer system. The software may include programming instructions and associated data and libraries. The software may implement one or more algorithms which may cause the computer to perform each function. The software may be stored on one or more tangible storage devices, such as one or more hard disk drives, CDs, DVDs, and/or flash memories. The software may be in source code and/or object code format. Associated data may be stored in any type of volatile and/or non-volatile memory.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents. Notwithstanding, none of the claims are intended to embrace subject matter which fails to satisfy the requirement of Sections 101, 102, or 103 of the Patent Act, nor should they be interpreted in such a way. Any unintended embracement of such subject matter is hereby disclaimed.

Except as stated immediately above, nothing which has been stated or illustrated is intended or should be interpreted to cause a dedication of any component, step, feature, object, benefit, advantage, or equivalent to the public, regardless of whether it is or is not recited in the claims.

What is claimed is:

1. A system comprising:
   a computer network interface configured to receive communications over a computer network sent from wireless mobile communication devices through a Wi-Fi connection and through a different type of wireless internet network connection; and
   a computer processing system configured to:
   determine whether each communication received from a mobile communication device was sent through the Wi-Fi connection or the different type of wireless internet network connection based on information in each received communication,
   wherein the determination whether each received communication was sent through the Wi-Fi connection or the different type of wireless internet network connection is based on a flag in each received communication, the flag being indicative of whether the communication is being sent through the Wi-Fi connection or the different type of wireless internet network connection;
   upon a determination indicating that one received communication was sent through the Wi-Fi connection, determine whether the one received communication is authentic using a first authentication method; and
   upon a determination indicating that another received communication was sent through the different type of wireless internet network connection, determine whether the other received communication is authentic using a second authentication method which is different from the first authentication method.

2. The system of claim 1 wherein the different type of wireless internet network connection is a cellular telecommunication system.

3. The system of claim 1 wherein the first authentication method is based on a mobile device number (MDN) and a mobile equipment identifier (MEID) for the mobile communication device included in the one received communication.

4. The system of claim 3 wherein the second authentication method is based on the MDN and another identifier of the mobile communication device different from the MEID included in the other received communication.

5. The system of claim 4 wherein the other identifier comprises an IP address for the mobile communication device.

6. The system of claim 1 wherein the second authentication method is based on a mobile device number (MDN) and another identifier of the mobile communication device different from a mobile equipment identifier (MEID) included in the other received communication.

7. A system comprising:
   a computer network interface configured to receive communications over a computer network sent from a wireless mobile communication device through a Wi-Fi connection and through a different type of wireless internet network connection, each communication received from the wireless mobile communication device including a communication request by the mobile communication device including a first identifier for the mobile communication device; and a computer processing system configured to:

determine whether each communication received from the mobile communication device was sent through the Wi-Fi connection or the different type of wireless internet network connection based on information in each received communication;

upon a determination indicating that one received communication was sent through the Wi-Fi connection, determine whether the one received communication is authentic using a first authentication method based on relationship of the first identifier and a second identifier for the mobile communication device; and upon a determination indicating that another received communication was sent through the different type of wireless internet network connection, determine whether the other received communication is authentic using a second authentication method which is different from the first authentication method, the second authentication method being based on relationship of the first identifier and a third identifier, which is different than the second identifier, for the mobile communication device.

8. The system of claim 7 wherein each communication request comprises an HTTPS request.

9. The system of claim 7 wherein the different type of wireless internet network connection utilizes communication through a cellular telecommunication system.

10. The system of claim 9 wherein the first mobile device identifier is a mobile device number (MDN) of the mobile communication device for communication through the cellular telecommunication system.

11. The system of claim 10 wherein:

the second identifier for the mobile communication device is one of a mobile equipment identifier (MEID) for the mobile communication device and an IP address assigned to the mobile communication device, and the third identifier for the mobile communication device is the other of the MEID for the mobile communication device and the IP address assigned to the mobile communication device.

12. A wireless mobile communication device comprising:

a computer network interface configured to send communications wirelessly over the internet through a Wi-Fi connection and at different times through a different type of wireless internet network connection, each sent communication including a communication request by the mobile communication device including a first identifier for the mobile communication device; and a computer processing system configured to:

determine whether the communications are being sent by the computer network interface through the Wi-Fi connection or through the different type of wireless internet network connection;

if the determination indicates that the communications are being sent by the computer network interface through the Wi-Fi connection, cause communication authentication information of a first type comprising a second identifier for the wireless mobile communication device to be included in each communication;

if the determination indicates that the communications are being sent by the computer network interface through the different type of wireless internet network connection, cause communication authentication information of a second type comprising a third identifier for the wireless mobile communication device, which is different from the second identifier, to be included in each communication.

13. The wireless mobile communication device of claim 12 wherein the second identifier includes a mobile equipment identifier (MEID) for the wireless mobile communication device.

14. The wireless mobile communication device of claim 12 wherein the third identifier includes an IP address for the wireless mobile communication device.

15. The wireless mobile communication device of claim 12 wherein the computer processing system is configured to cause the communication authentication information of the first and the second type to include a flag indicative of whether the communication is being sent through the Wi-Fi connection or the different type of wireless internet network connection.

16. The wireless mobile communication device of claim 12 wherein the different type of internet connection is a cellular telecommunication system.

17. The wireless mobile communication device of claim 12 wherein the wireless mobile communication device is a smart phone.

18. The wireless mobile communication device of claim 12 wherein the first identifier is a mobile device number (MDN) for the wireless mobile communication device and the second identifier is a mobile equipment identifier (MEID) for the wireless mobile communication device.

19. The wireless mobile communication device of claim 18 wherein the third identifier is an IP address for the wireless mobile communication device.

* * * * *